United States Patent Office 3,558,632
Patented Jan. 26, 1971

3,558,632
2-(BENZONAPHTHYRIDIN-2-YL ACYL) BENZONAPHTHYRIDINES
James L. Diebold, Havertown, and Milton Wolf, West Chester, Pa., assignors to American Home Products Corporation, New York, N.Y., a corporation of Delaware
No Drawing. Continuation-in-part of application Ser. No. 581,706, Sept. 26, 1966. This application Sept. 16, 1968, Ser. No. 760,069
Int. Cl. C07d 39/00
U.S. Cl. 260—287
10 Claims

ABSTRACT OF THE DISCLOSURE

This invention concerns 2-(tetrahydrobenzonaphthyridin-2-yl acyl)tetrahydrobenzonaphthyridines; 2-(octahydrobenzonaphthyridin-2-yl acyl)octahydrobenzonaphthyridines; 2-(octahydrobenzonaphthyridin-2-yl acyl)tetrahydrobenzonaphthyridines; and 2-(tetrahydrobenzonaphthyridin-2-yl acyl)octahydrobenzonaphthyridines which have demonstrated activity as antibacterial agents.

This application is a continuation-in-part of U.S. patent application, Ser. No. 581,706, entitled "2-(Benzonaphthyridin-2-yl Acyl)Benzonaphthyridines," filed on Sept. 26, 1966 by James L. Diebold and Milton Wolf, now abandoned.

This invention relates to new and novel 2-(benzonaphthyridin-2-yl acyl)benzonaphthyridines as well as to a novel method for their preparation. In particular, the present invention is concerned with 2-(tetrahydrobenzonaphthyridin-2-yl acyl)tetrahydrobenzonaphthyridines; 2-(octahydrobenzonaphthyridin-2-yl acyl)octahydrobenzonaphthyridines; 2 - (octahydrobenzonaphthyridin - 2 - yl acyl)tetrahydrobenzonaphthyridines; and 2-(tetrahydrobenzonaphthyridin - 2-yl acyl)octahydrobenzonaphthyridines which in standard and accepted tests have demonstrated activity as antibacterial agents, especially as antitubercular agents.

The novel compounds which are included within the scope of the present invention are represented by the following formulae:

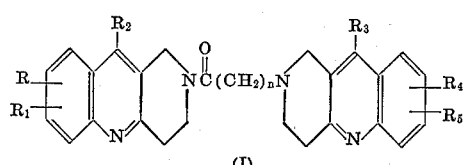

(I)

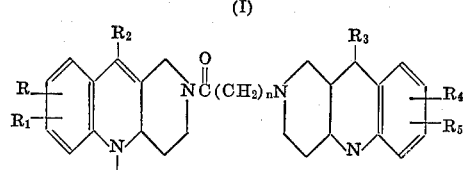

(II)

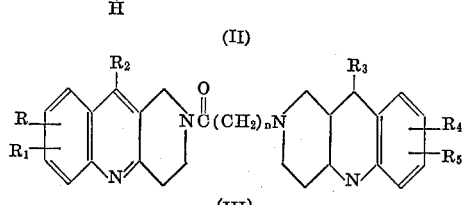

(III)

and

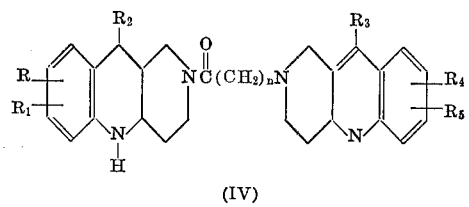

(IV)

wherein R, $R_1$, $R_4$ and $R_5$ are selected from the group consisting of hydrogen, halogen, trifluoromethyl, carb(lower)alkoxy, cyano, carbamoyl, sulfamoyl, lower alkyl, lower alkoxy, lower alkylsulfonyl and lower alkylthio; $R_2$ and $R_3$ are both selected from the group consisting of hydrogen, lower alkyl, di(lower)alkylamino, di(lower)alkylamino(lower)alkylamino, lower alkylthio, di(lower)alkylaminoalkylthio, lower alkoxy, di(lower)alkylamino(lower)alkoxy, phenyl, halophenyl, lower alkylphenyl, lower alkoxyphenyl, phen(lower)alkyl, pyridyl, thienyl and furyl; $n$ is an integer from 1 to 6; and the acid addition salts thereof. As employed herein the terms "lower alkyl," "lower alkoxy" and the like are meant to include both branched and straight chain moieties having from 1 to about six carbon atoms.

The new compounds represented by structural formula (I) properly are called: "2-(tetrahydrobenzonaphthyridin-2-yl acyl)tetrahydrobenzonaphthyridines." Typical examples thereof are: 8-chloro-2-[2-(8-chloro-1,2,3,4-tetrahydro-10-phenylbenzo[b][1,6]naphthyridin-2-yl)acetyl]-1,2,3,4-tetrahydro-10-phenylbenzo[b][1,6]naphthyridine; and 8 - chloro - 2-[2-(1,2,3,4-tetrahydro-10-phenylbenzo[b][1,6]naphthyridin - 2 - yl)acetyl]-1,2,3,4-tetrahydro-10-phenylbenzo[b][1,6]naphthyridine. Those compounds of structural Formula II are called: "2-(octahydrobenzonaphthyridin - 2-yl acyl)octahydrobenzonaphthyridines," such as: 8-chloro-2-[2-(8-chloro-1,2,3,4,4a,5,10,10a-octahydro-10-phenylbenzo[b][1,6]naphthyridin-2-yl)acetyl]-1,2,3,4,4a,5,10,10a - octahydro - 10 - phenylbenzo[b][1,6]naphthyridine; and 8 - chloro - 2 - [2 - (1,2,3,4,4a,5,10,10a - octahydro-10-phenyl-benzo[b][1,6]naphthyridin-2 - yl)acetyl] - 1,2,3,4,4a,5,10,10a-octahydro-10-phenylbenzo[b][1,6]naphthyridine.

The compounds which are depicted by structural Formula III are named: "2-(octahydrobenzonaphthyridin-2-yl acyl)tetrahydrobenzonaphthyridines," for example: 8 - bromo - 2-[2-(8-chloro-1,2,3,4,4a,5,10,10a-octahydro-10 - phenylbenzo[b][1,6]naphthyridin - 2 - yl)acetyl]-1,2,3,4 - tetrahydro - 10 - phenylbenzo[b][1,6]naphthyridine; and 8-chloro-2-[3-(1,2,3,4,4a,5,10,10a-octahydro-10 - (2 - thienyl)benzo[b][1,6]naphthyridin - 2 - yl)propionyl] - 1,2,3,4 - tetrahydro - 10-(4-tolyl)benzo[b][1,6]naphthyridine. When the compounds of this invention are characterized by structural Formula IV, they are called: "2 - (tetrahydrobenzonaphthyridin - 2-yl acyl)octahydronaphthyridines," examples thereof are: 8-chloro-2-[2-(8-chloro - 1,2,3,4-tetrahydro-10-phenylbenzo[b][1,6]naphthyridin - 2 - yl)acetyl]-1,2,3,4,4a,5,10,10a-octahydro-10-phenylbenzo[b][1,6]naphthyridine; and 8-bromo-2-[2-(8-chloro - 1,2,3,4 - tetrahydro-10-propylbenzo[b][1,6]naphthyridin - 2 - yl)acetyl]-1,2,3,4,4a,5,10,10a-octahydro-10-phenylbenzo[b][1,6]naphthyridine.

The new and novel 2-(benzonaphthyridin-2-yl acyl) benzonaphthyridines of this invention may be prepared by the reaction of a 2-haloacyl benzonaphthyridine of the formula:

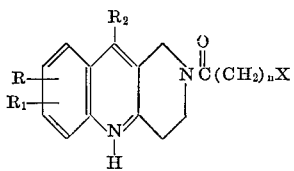

wherein R, $R_1$, $R_2$ and the integer $n$ have the same meaning as previously set forth, the grouping:

represents a pair of optional double bonds and X is halogen, with a benzonaphthyridine of formula:

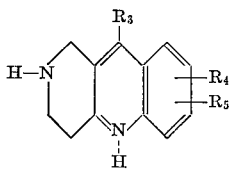

wherein $R_3$, $R_4$ and $R_5$ are defined as above, and the grouping

represents a pair of optional double bonds. In practicing the process outlined above, a substantially equimolar mixture of the reactants is admixed, in a reaction-inert organic solvent, in the presence of an alkaline condensing agent at a temperature from about 20° C. to about 165° C. for a period of from about one hour to about twenty-four hours. Preferably, this reaction is conducted in dimethylformamide at about 50° C. for a period of about three hours.

These time and temperature ranges are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By reaction-inert organic solvent as employed herein is meant an organic solvent which dissolves the reactants and does not prevent or interfere with their interaction. Among the preferred solvents are dimethylformamide, dimethylacetamide, benzene and toluene. The amount of solvent used is not critical, it being only necessary to use sufficient solvent to provide a reaction medium for the reactants. By alkaline condensing agent as employed herein is meant an alkali metal hydroxide, carbonate or bicarbonate.

After the reaction is complete, the reaction mixture is cooled, and the product obtained by conventional methods, for example, filtration, concentration, reconstitution of the residue with a polar, water-immiscible organic solvent, e.g. methylene chloride and chloroform; washing with water, drying, concentration and recrystallization from a suitable solvent, such as pyridine.

Alternatively, the 2-(octahydrobenzonaphthyridin-2-yl acyl) octahydrobenzonaphthyridines may be prepared by the hydrogenation of the corresponding 2-(tetrahydrobenzonaphthyridin-2-yl acyl) tetrahydrobenzonaphthyridines; the 2-(octahyrobenzonaphthyridin-2-yl-acyl)tetrahydrobenzonaphthyridines or the 2-(tetrahydrobenzonaphthyridin-2-yl acyl)octahydrobenzonaphthyridines. Although various reduction procedures may be employed, a preferred method to effect this conversion is the use of a reducing agent such as hydrogen. Utilizing this preferred method, the reactant is admixed with glacial acetic acid and platinum oxide at about 30° C., under a hydrogen pressure of about 50 p.s.i., for a period of about twenty-four hours. Thereafter, the product is separated by evaporation of the excess acetic acid and the residue is dissolved in water, basified and recrystallized to yield the appropriate 2-(octahydrobenzonaphthyridin-2-yl acyl) octahydronaphthyridine.

The reactants employed in the process of this invention are known compounds, both the 2-haloacyl benzonaphthyridines and the benzonaphthyridines, are prepared by the procedures disclosed in a copending application, U.S. Ser. No. 760,063, entitled "1,2,3,4-Tetrahydrobenzo[b][1,6]Naphthyridine Derivatives," by Milton Wolf and James L. Diebold which was submitted for filing in the U.S. Patent Office on the same day as the subject application, which is a continuation-in-part of U.S. patent applications: U.S. Ser. No. 581,756, entitled "1,2,3,4-Tetrahydrobenzo[b][1,6]Naphthyridine Derivatives," filed on Sept. 26, 1966 and U.S. Ser. No. 533,793, having the same title, filed on Mar. 14, 1966 which parent applications are now abandoned. Alternatively, these reactants may be prepared by the procedure described by Kempter et al. in Z. Chem. 4(1), 29–30 (1964).

Since many of the compounds of the present invention are basic, advantage may be taken of the water solubility of salts of these compounds formed with acids in the isolation and/or purification of the above compounds and in the preparation of aqueous solutions of these new compounds. Particularly effective salts are those formed with acids having a pH value of 3 or lower. Such acids are well known in the art, for example, hydrochloric, hydrobromic, sulfuric, nitric, phosphoric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

In accord with the present invention, the 2-(benzonaphthyridin-2-yl acyl)benzonaphthyridines herein described have been found to possess interesting antibacterial properties. More particularly, these compounds, in standard bacteriological tests have exhibited utility as antibacterial agents, especially as antitubercular agents. Further, the 2-(tetrahydrobenzonaphthyridin-2-yl acyl) tetrahydrobenzonaphthyridines, the 2-(octahydrobenzonaphthyridin-2-yl acyl) tetrahydrobenzonaphthyridines and the 2-(tetrahydrobenzonaphthyridin-2-yl acyl)octahydrobenzonaphthyridines of this invention have demonstrated a utility as intermediates in the production of their corresponding 2-(octahydrobenzonaphthyridin-2-yl acyl) octahydrobenzonaphthyridines.

The in vitro bacteriocidal activity of the compounds of this invention against tubercle bacilli is tested by the following procedure:

A stock solution containing 1000 μg./ml. of a 2-(benzonaphthyridin-2-yl acyl)benzonaphthyridine in a suitable vehicle, e.g. water and dimethylacetamide is prepared. One ml. quantities of various dilutions of this stock solution are individually added to tubes containing 9 ml. of medium to give final concentrations within the range of 0.01 to 100 μg./ml. These tubes are then seeded with 0.1 ml. of standardized bacterial suspension and incubated for two weeks at 37° C. The media employed in Dubos Oleic acid liquid medium and the stock cultures are maintained on Dorset Egg Agar. The organisms used are *M. tuberculosis*, human type, strain H 37 Rv and *M. tuberculosis*, bovine type, strain Ravenel. The results are expressed as minimal inhibitory concentration (MIC) in μg./ml. which is the least concentration of a compound that completely inhibits the growth of the organism.

In the above test, the 2-(benzonaphthyridin-2-yl acyl)-benzonaphthylridine compounds of this invention completely inhibit the growth of tubercle bacilli at a MIC in the range of about 5 to about 10 μg./ml.

As has been mentioned hereinabove, the new 2-(benzonaphthyridin-2-yl acyl)benzonaphthyridine compounds of this invention are biocidally active, as antibacterial agents. In this connection, they exhibit in vitro activity against pathogenic bacteria, specifically in vitro antitubercular activity as bacteriocidal agents against tubercle bacteria. Their bacteriocidal properties make these compounds valuable in biocidal compositions in a variety of important fields of use. For example, they can be formulated and used in bacteriocidally active institutional cleaning compositions, and in soaps and detergents. These compositions are employed in washing in hospitals and homes, instruments used in medicine and bacteriology, clothing used in bacteriological laboratories, and floors, walls and ceiling in rooms in which a background free of tubercle bacteria is desired. They are applied according to the desired end-use as powders, solutions, suspensions and the like, containing the active substance generally in concentrations of 0.1% to 0.7% by weight, or even as much as 1%, 1.5%, 1.8%, 2% and up to about 5%. In washing solutions, e.g. for hospitals and homes, the active compounds of this invention will be used generally in the range of from about 0.2% to .25% by weight.

Although, in common with most organic substances with relatively high molecular weights, the compounds of this invention have limited solubility in water, those skilled in the art will have no great difficulty in formulating them into a wide variety of biocidally-active compositions. In general, standard techniques can be employed and, where necessary, advantage is taken of the ability of compounds of this invention to form salts with acids, which have enhanced solubility in water. The active compounds per se can be made up in dilute aqueous solution. They can, in addition, where required be made up into more concentrated formulations with solvents such as dimethylacetamide, pyridine and the like. They can also be formulated as suspensions or solutions in an aqueous vehicle containing an organic co-solvent, such as, for example, methanol. Also, aqueous vehicles containing emulsifying agents, such as sodium lauryl sulfate, and relatively high concentrations, e.g., up to about 5% by weight, of the compounds of this invention can be formulated by conventional techniques.

The following examples are given by way of illustration.

EXAMPLE I

A solution of 8-chloro-2-chloroacetyl-1,2,3,4-tetrahydro - 10 - phenylbenzo[b][1,6]naphthyridine (3.91 g.), 8-chloro - 1,2,3,4 - tetrahydro-10-phenylbenzo[b][1,6]naphthyridine (2.95 g.), anhydrous potassium carbonate (2.76 g.) and dimethyl formamide (50 ml.) is heated at 55° C. for three hours. Thereafter, the reaction mixture is filtered, concentrated and the residue dissolved in methylene chloride which is then washed with water, dried over anhydrous sodium sulfate and concentrated. The crude product is then recrystallized from pyridine to afford 8-chloro-2-[2-(8-chloro-1,2,3,4 - tetrahydro - 10 - phenylbenzo[b][1,6]-naphthyridin - 2 - yl)acetyl]-1,2,3,4-tetrahydro-10-phenylbenzo[b][1,6]naphthyridine as a yellow solid, M.P. 259-260° C.

Analysis.—Calcd. for $C_{38}H_{30}Cl_2N_2O$ (percent): C, 72.49; H, 4.80; N, 8.90; Cl, 11.3. Found (percent) C, 72.07; H, 4.80; N, 9.20; Cl, 10.9.

EXAMPLE II

A solution of 8-chloro-2-chloroacetyl-1,2,3,4-tetrahydro - 10 - phenylbenzo[b][1,6]naphthyridine (4.0 g.), 1,2,3,4 - tetrahydro-10-phenylbenzo[b][1,6]naphthyridine (4.0 g.), 1 N sodium hydroxide (1.0 ml.) and dimethylacetamide (50 ml.) is heated at 75° C. for two hours. Thereafter, the reaction mixture is filtered, concentrated and the residue dissolved in chloroform which is then washed with water, dried over anhydrous sodium sulfate and concentrated. The crude product is then recrystallized from pyridine to afford 8 - chloro-2-[2-(1,2,3,4-tetrahydro-10-phenylbenzo[b][1,6]naphthyridin-2 - yl)acetyl] - 1,2,3,4-tetrahydro-10-phenylbenzo[b][1,6]naphthyridine.

In a similar manner, 7-bromo-2-(3-bromopropionyl)-1,2,3,4 - tetrahydro - 10-(4-tolyl)benzo[b][1,6]naphthyridine and 1,2,3,4 - tetrahydro - 10 - (4-methoxyphenyl)-8-methylbenzo[b][1,6]naphthyridine are reacted to obtain 7-bromo-2-[3-(1,2,3,4-tetrahydro-10 -(4-methoxyphenyl)-8 - methylbenzo[b][1,6]naphthydridin - 2 - yl)propionyl]-1,2,3,4 - tetrahydro - 10-(4-tolyl)benzo[b][1,6]naphthyridine.

EXAMPLE III

A solution of 8-chloro-2-(4 - chlorobutyryl) - 1,2,3,4-tetrahydrobenzo[b][1,6]naphthyridine (8.0 g.), 10 - (4-bromophenyl) - 1,2,3,4-tetrahydrobenzo[b][1,6]naphthyridine (8.0 g.), anhydrous sodium carbonate (6.0 g.) and dimethylacetamide (100 ml.) is heated at 160° C. for one hour. Thereafter, the reaction mixture is filtered, concentrated and the residue dissolved in chloroform which is then washed with water, dried over anhydrous sodium sulfate and concentrated. The crude product is then recrystallized from pyridine to afford 2-[4-(10-[4-bromophenyl]-1,2,3,4-tetrahydrobenzo[b][1,6]naphthyridin - 2 - yl)-butyryl]-8-chloro-1,2,3,4 - tetrahydrobenzo[b][1,6]naphthyridine.

Similarly, the following compounds are prepared: 10-benzyl - 2 - [2-(8-ethyl-1,2,3,4-tetrahydro-10-phenylbenzo[b][1,6]naphthyridin-2 - yl)acetyl] - 1,2,3,4 - tetrahydrobenzo[b][1,6]naphthyridine; and 2-[5-(7-bromo-1,2,3,4-tetrahydro - 10-[2-phenethyl]benzo[b][1,6]naphthyridin-2-yl)valeryl]-7-ethoxy-1,2,3,4-tetrahydro-10-(3 - phenpropyl)benzo[b][1,6]naphthyridine.

EXAMPLE IV

A solution of 8-chloro - 2 - chloroacetyl - 1,2,3,4 - tetrahydro - 10 - (2 - pyridyl)benzo[b][1,6]naphthyridine (2.0 g.), 7 - chloro - 1,2,3,4 - tetrahydro - 10 - phenylbenzo[b][1,6]naphthhydridine (2.0 g.), potassium bicarbonate (1.5 g.) and benzene (30 ml.) is heated at 75° C. for four hours. Thereafter, the reaction mixture is filtered, concentrated and the residue dissolved in ether which is then washed with water, dried over anhydrous sodium sulfate and concentrated. The crude product is then recrystallized from pyridine to afford 8-chloro-2-[2-(7-chloro-1,2,3,4 - tetrahydro-10-phenylbenzo[b][1,6]naphthyridin-2-yl)acetyl] - 1,2,3,4 - tetrahydro - 10 - (2 - pyridyl)benzo[b][1,6]naphthyridine.

In the same manner, reacting 2-bromoacetyl-1,2,3,4-tetrahydro - 8 - iodo-10-(2 - thienyl)benzo[b][1,6]naphthyridine with 10-(2 - furyl)-1,2,3,4-tetrahydrobenzo[b][1,6]naphthyridine affords 2-[2-(10-[2 - furyl]-1,2,3,4-tetrahydrobenzo[b][1,6]naphthyridin - 2 - yl)acetyl]-1,2,3,4-tetrahydro-8-iodo-10-(2 - thienyl)benzo[b][1,6]naphthyridine.

EXAMPLE V

Repeating the procedure of Example IV to react an appropriate 2-haloacyl tetrahydronaphthyridine with a tetrahydronaphthylridine, the hereinafter listed products are obtained:

8-chloro - 2 - [3-(1,2,3,4-tetrahydro-10-phenyl-8-propylbenzo[b][1,6-]naphthyridin - 2 - yl)propionyl] - 1,2,3,4-tetrahydro-10-(2-thienyl)benzo[b][1,6]naphthyridine;

8-chloro - 10 - (2-chlorophenyl)-2-[6-(1,2,3,4-tetrahydro - 7,10 - dimethylbenzo[b][1,6]naphthyridin - 2 - yl)caproyl]-1,2,3,4-tetrahydrobenzo[b][1,6]naphthyridine;

7-butoxy - 2 - [2-(10-[4-ethylphenyl]-1,2,3,4-tetrahydrobenzo[b][1,6]naphthyridin - 2 - yl)acetyl] - 1,2,3,4-tetrahydro - 10 - (4-methoxyphenyl)benzo[b][1,6]naphthyridine;

2-[3-(1,2,3,4-tetrahydro - 10 - [4-phenbutyl]-benzo[b][1,6]naphthyridin-2-yl)propionyl] - 1,2,3,4 - tetrahydro-10-phenylbenzo[b][1,6]naphthyridine;

7-bromo - 2 - [2-(8-chloro-1,2,3,4-tetrahydro-10-phenylbenzo[b][1,6]naphthyridin - 2 - yl)acetyl]-10-(4-ethylphenyl)-1,2,3,4-tetrahydrobenzo[b][1,6]naphthyridine;

2-[2-(1,2,3,4 - tetrahydro - 10 - propylbenzo[b][1,6]naphthyridin - 2 - yl)acetyl]-1,2,3,4-tetrahydro-10-propylbenzo[b][1,6]naphthyridine; and 10-ethyl - 2 - [4 - (1,2,3,4-tetrahydro-10-phenylbenzo[b][1,6]naphthyridin - 2 - yl)butyryl]-1,2,3,4-tetrahydrobenzo[b][1,6]naphthyridine.

EXAMPLE VI

A solution of 8-chloro-2-[2-(8-chloro-1,2,3,4-tetrahydro-10-phenylbenzo[b][1,6]naphthyridin - 2 - yl)acetyl]-1,2,3,4 - tetrahydro-10-phenylbenzo[b][1,6]naphthyridine (6.0 g.) in glacial acetic acid (100 ml.) containing platinum oxide (0.3 g.) is hydrogenated at room temperature, and at an initial hydrogen pressure of 46.5 p.s.i. for a period of twenty-four hours. The excess acetic acid is removed, distilled in vacuo, the residue dissolved in water, and then basified whereupon the crude product separates. Recrystallization from pyridine affords 8-chloro-2-[2-(8-chloro-1,2,3,4,4a,5,10,10a-octahydro - 10 - phenylbenzo[b][1,6]naphthyridin - 2 - yl)acetyl]-1,2,3,4,4a,5,10,10a-octahydro-10-phenylbenzo[b][1,6]naphthyridine.

EXAMPLE VII

Employing the procedure of Example VI upon the above prepared 2-[tetrahydrobenzonaphthyridin - 2 - yl acyl]tetrahydrobenzonaphthyridines the following 2-[octahydrobenzonaphthyridin - 2 - yl acyl] octahydrobenzonaphthyridines are produced:

8-chloro - 2 - [2 - (1,2,3,4,4a,5,10,10a-octahydro-10-phenylbenzo[b][1,6]naphthyridin - 2 - yl)acetyl]-1,2,3,4,4a,5,10,10a-octahydro - 10 - phenylbenzo[b][1,6]naphthyridine;

7-bromo - 2 - [3 - (1,2,3,4,4a,5,10,10a-octahydro-10-[4-methoxyphenyl] - 8 - methylbenzo[b][1,6]naphthyridin - 2 - yl)propionyl]-1,2,3,4,4a,5,10,10a-octahydro-10-(4-tolyl)-benzo[b][1,6]naphthyridine;

2-[4-(10-[4-bromophenyl] - 1,2,3,4,4a,5,10,10a - octahydrobenzo[b][1,6]naphthyridin - 2 - yl)butyryl]-8-chloro - 1,2,3,4,4a,5,10,10a - octahydrobenzo[b][1,6]naphthyridine;

10-benzyl - 2 - [2-(8-ethyl-1,2,3,4,4a,5,10,10a-octahydro - 10 - phenylbenzo[b][1,6]naphthyridin-2-yl)acetyl]-1,2,3,4,4a,5,10,10a - octahydrobenzo[b][1,6]naphthyridine;

2-[5-(7-bromo - 1,2,3,4,4a,5,10,10a - octahydro-10-[2-phenethyl]benzo[b][1,6]naphthyridin - 2 - yl)valeryl]-7-ethoxy - 1,2,3,4,4a,5,10,10a-octahydro-10-(3-phenpropyl)benzo[b][1,6]naphthyridine;

8-chloro - 2 - [2-(7-chloro-1,2,3,4,4a,5,10,10a-octahydro - 10 - phenylbenzo[b][1,6]naphthyridin-2-yl)acetyl]-1,2,3,4,4a,5,10,10a - octahydro - 10 - (2 - pyridyl)benzo[b][1,6]naphthyridine;

2-[2-(10-[2-furyl] - 1,2,3,4,4a,5,10,10a - octahydrobenzo[b][1,6]naphthyridin - 2 - yl)acetyl]-1,2,3,4,4a,5,10,10a-octahydro - 8 - iodo-10-(2-thienyl)benzo[b]1,6]naphthyridine;

8-chloro-2-[3 - (1,2,3,4,4a,5,10,10a - octahydro - 10-phenyl - 8 - propylbenzo[b][1,6]naphthyridin - 2 - yl)propionyl]-1,2,3,4,4a,5,10,10a-octahydro - 10 - (2-thienyl)benzo[b][1,6]naphthyridine;

8-chloro - 10 - (2-chlorophenyl)-2-[6-(1,2,3,4,4a,5,10,10a - octahydro - 7,10-dimethylbenzo[b][1,6]naphthyridin - 2 - yl)caproyl] - 1,2,3,4,4a,5,10,10a-octahydrobenzo[b][1,6]naphthyridine;

7-butoxy - 2 - [2-(10-[4-ethylphenyl]-1,2,3,4,4a,5,10,10a - octahydrobenzo[b][1,6]naphthyridin - 2 - yl)acetyl]-1,2,3,4,4a,5,10,10a - octahydro - 10 - (4-methoxyphenyl)benzo[b][1,6]naphthyridine;

2-[3-(1,2,3,4,4a,5,10,10a - octahydro - 10 - [4-phenbutyl]benzo[b][1,6]naphthyridin - 2 - yl)propionyl]-1,2,3,4,4a,5,10,10a - octahydro - 10 - phenylbenzo[b][1,6]naphthyridine;

7-bromo - 2 - [2-(8-chloro-1,2,3,4,4a,5,10,10a - octahydro - 10 - phenylbenzo[b][1,6]naphthyridin - 2 - yl)acetyl]-10-(4-ethylphenyl) - 1,2,3,4,4a,5,10,10a - octahydrobenzo[b][1,6]naphthyridine;

2-[2-(1,2,3,4,4a,5,10,10a-octahydro - 10 - propylbenzo[b][1,6]naphthyridin - 2 - yl)acetyl] - 1,2,3,4,4a,5,10,10a-octahydro-10-propylbenzo[b][1,6]naphthyridine; and 10-ethyl - 2 - [4-(1,2,3,4,4a,5,10,10a - octahydro-10-phenylbenzo[b][1,6]naphthyridin - 2 - yl)butyryl]-1,2,3,4,4a,5,10,10a-octahydro[b][1,6]naphthyridine.

EXAMPLE VIII

A solution of 8-bromo-2-chloroacetyl-1,2,3,4-tetrahydro - 10 - phenylbenzo[b][1,6]naphthyridine (4.0 g.), 8-chloro-1,2,3,4,4a,5,10,10a - octahydro - 10 - phenylbenzo[b][1,6]naphthyridine (4.0 g.), anhydrous potassium carbonate (3.0 g.) and dimethyl formamide (50 ml.) is heated at 50° C. for three hours. Thereafter, the reaction mixture is filtered, concentrated and the residue dissolved in methylene chloride which is then washed with water, dried over anhydrous sodium sulfate and concentrated. The crude product is then recrystallized from pyridine to afford 8-bromo - 2 - [2-(8-chloro - 1,2,3,4,4a,5,10,10a-octahydro - 10 - phenylbenzo[b][1,6]naphthyridin - 2-yl)acetyl] - 1,2,3,4 - tetrahydro - 10 - phenylbenzo[b][1,6]naphthyridine.

EXAMPLE IX

A solution of 8-chloro-2-(3-bromopropionyl)-1,2,3,4-tetrahydro - 10 - (4 - tolyl)benzo[b][1,6]naphthyridine (12.0 g.), 1,2,3,4,4a,5,10,10a-octahydro - 10 - (2-thienyl)benzo[b][1,6]naphthyridine (12.0 g.), anhydrous sodium carbonate (9.0 g.) and dimethylacetamide (150 ml.) is stirred at room temperature for twenty-four hours. Thereafter, the reaction mixture is filtered, concentrated and the residue dissolved in chloroform which is then washed with water, dried over anhydrous sodium sulfate and concentrated. The crude product is then recrystallized from pyridine to afford 8-chloro-2-[3-(1,2,3,4,4a,5,10,10a-octahydro-10-(2 - thienyl)benzo[b][1,6]naphthyridin-2-yl)propionyl] - 1,2,3,4 - tetrahydro-10-(4-tolyl)benzo[b][1,6]naphthyridine.

EXAMPLE X

Employing the procedure of Examples VIII and IX to react an appropriate 2-haloacyl tetrahydrobenzonaphthyridine with an octahydrobenzonaphthyridine, the hereinafter listed compounds are prepared:

7 - ethyl - 2 - [2 - (1,2,3,4,4a,5,10,10a-octahydro-10-[4-iodophenyl]benzo[b][1,6]naphthyridin-2 - yl)acetyl]-1,2,3,4-tetrahydro-10-phenylbenzo[b][1,6]naphthyridine;

8 - chloro - 2 - [3 - (1,2,3,4,4a,5,10,10a - octahydro-10-phenyl - 8 - propylbenzo[b][1,6]naphthyridin-2-yl)propionyl] - 1,2,3,4 - tetrahydro-10-(2-thienyl)benzo[b][1,6]naphthyridine;

8-chloro-10-(2 - chlorophenyl-2-[6-(1,2,3,4,4a,5,10,10a-octahydro - 7,10 - dimethylbenzo[b][1,6]naphthyridin-2-yl)caproyl] - 1,2,3,4 - tetrahydrobenzo[b][1,6]naphthyridine;

7-bromo-2-[2-(8 - chloro-1,2,3,4,4a,5,10,10a-octahydro-10 - phenylbenzo[b][1,6]naphthyridin-2-yl)acetyl]10-(4-ethylphenyl) - 1,2,3,4-tetrahydrobenzo[b][1,6]naphthyridine; and 10-ethyl-2-[4-(1,2,3,4,4a,5,10,10a-octahydro-10-phenylbenzo[b][1,6]naphthyridin-2-yl)butyryl] - 1,2,3,4 - tetrahydrobenzo[b][1,6]naphthyridine.

EXAMPLE XI

A solution of 8-bromo-2-[2-(8-chloro-1,2,3,4,4a,5,10,10a-octahydro - 10 - phenylbenzo[b][1,6]naphthyridin-2-yl)acetyl]-1,2,3,4 - tetrahydro - 10 - phenylbenzo[b][1,6]naphthyridine (12.0 g.) in glacial acetic acid (100 ml.) containing platinum oxide (0.3 g.) is hydrogenated at room temperature and at an initial hydrogen pressure of 46.5 p.s.i. for a period of twenty-four hours. The excess acetic acid is distilled in vacuo, the residue dissolved in water, and then basified, whereupon the product separates. The product is then recrystallized from cyclohexane-hexane to yield 8-bromo-2-[2-(8-chloro-1,2,3,4,4a,5,10, 10a-octahydro-10-phenylbenzo[b][1,6]naphthyridin-2-yl) acetyl] - 1,2,3,4,4a,5,10,10a-octahydro-10-phenylbenzo[b] [1,6]naphthyridine.

EXAMPLE XII

A solution of 8-chloro-2-chloroacetyl-1,2,3,4,4a,5,10, 10a-octahydro-10-phenylbenzo[b][1,6]naphthyridine (1.0 g.), 8 - chloro-1,2,3,4-tetrahydro-10-phenylbenzo[b][1,6] naphthyridine (1.0 g.), anhydrous potassium carbonate (0.75 g.) and dimethylformamide (20 ml.) is heated at 60° C. for four hours. Thereafter, the reaction mixture is filtered, concentrated and the residue dissolved in methylene chloride which is then washed with water, dried over anhydrous sodium sulfate and concentrated. The crude product is then recrystallized from pyridine to afford 8-chloro-2-[2-(8-chloro-1,2,3,4 - tetrahydro-10-phenylbenzo [b][1,6]naphthyridin - 2 - yl)acetyl]-1,2,3,4,4a,5,10,10a-octahydro-10-phenylbenzo[b][1,6]naphthyridine.

In a similar manner, 8-chloro-2-(3-fluoropionyl)-1,2,3,4,4a,5,10,10a - octahydro-10-(4-tolyl)benzo[b][1,6] naphthyridine is reacted with 1,2,3,4-tetrahydro-10-(2-thienyl)benzo[b][1,6]naphthyridine to yield 8-chloro-2-[3 - (1,2,3,4 - tetrahydro - 10 - (2 - thienyl)benzo[b][1,6] naphthyridin - 2 - yl)propionyl]-1,2,3,4,4a,5,10,10a-octa-hydro-10-(4-tolyl)benzo[b][1,6]naphthyridine.

EXAMPLE XIII

A solution of 8-bromo-2-bromoacetyl-1,2,3,4,4a,5,10, 10a-octahydro-10-phenylbenzo[b][1,6]naphthyridine (8.0 g.) 8-chloro - 1,2,3,4 - tetrahydro-10-propylbenzo[b][1,6] naphthyridine (8.0 g.), anhydrous sodium carbonate (6.0 g.) and dimethylacetamide (100 ml.) is heated at 160° C. for one hour. Thereafter, the reaction mixture is filtered, concentrated and the residue dissolved in chloroform which is then washed with water, dried over anhydrous sodium sulfate and concentrated. The crude product is then recrystallized from pyridine to afford 8-bromo-2-[2-(8 - chloro - 1,2,3,4 - tetrahydro-10-propylbenzo[b][1,6] naphthyridin-2-yl)acetyl] - 1,2,3,4,4a,5,10,10a-octahydro-10-phenylbenzo[b][1,6]naphthyridine.

EXAMPLE XIV

Repeating the procedure of Examples XII and XIII to react an appropriate 2-haloacyl octahydrobenzonaphthyridine with a tetrahydrobenzonaphthyridine, the hereinafter listed compounds are obtained:

9-bromo - 2 - [3-(8-chloro-10-[4-chlorophenyl]-1,2,3,4-tetrahydrobenzo[b][1,6]naphthyridin - 2 - yl)propionyl]-1,2,3,4,4a,5,10,10a-octahydro - 10 - (2 - pyridyl)benzo[b] [1,6]naphthyridine;

2-[6-(1,2,3,4-tetrahydro - 8,10 - dipropylbenzo[b][1,6] naphthyridin-2-yl)caproyl] - 1,2,3,4,4a,5,10,10a - octahydro-(4-iodophenyl)benzo[b][1,6]naphthyridine;

2-[4-(10-[4 - bromophenyl]-1,2,3,4-tetrahydrobenzo[b] [1,6]naphthyridin-2-yl)butyryl]-8-chloro - 1,2,3,4,4a,5,10, 10a-octahydrobenzo[b][1,6]naphthyridine;

10-benzyl-2-[2-(6-chloro - 1,2,3,4 - tetrahydrobenzo[b] [1,6]naphthyridin-2-yl)acetyl] - 1,2,3,4,4a,5,10,10a - octahydrobenzo[b][1,6]naphthyridine; and 2-[2-(7 - bromo - 1,2,3,4 - tetrahydro-10-[2-phenethyl] benzo[b][1,6]naphthyridin-2-yl)acetyl] - 7 - ethoxy-1,2,3, 4,4a,5,10,10a - octahydro-10-(2-phenethyl)benzo[b][1,6] naphthyridine.

EXAMPLE XV

A solution of 8-chloro-2-[2-(8-chloro-1,2,3,4-tetrahydro-10-phenylbenzo[b][1,6]naphthyridin - 2 - yl)acetyl]-1,2,3,4,4a,5,10,10a-octahydro - 10 - phenylbenzo[b][1,6] naphthyridine (24.0 g.) as prepared in Example XII, in glacial acetic acid (200 ml.) containing platinum oxide (0.6 g.) is hydrogenated at room temperature and at an initial hydrogen pressure of 46.5 p.s.i. for a period of forty hours. The acetic acid is removed under vacuum, the residue dissolved in water and then basified, whereupon the product separates. Upon recrystallization of this product from hexane, there is obtained 8-chloro-2-[2-(8-chloro-1,2,3,4,4a,5,10,10a-octahydro - 10 - phenylbenzo[b][1,6] naphthyridin-2-yl)acetyl]-1,2,3,4,4a,5,10,10a - octahydro-10-phenylbenzo[b][1,6]naphthyridine.

EXAMPLE XVI

A solution of 7,8-dichloro-2-chloroacetyl-1,2,3,4-tetrahydro - 10 - (2 - pyridyl)benzo[b][1,6]naphthyridine (2.0 g.), 1,2,3,4-tetrahydro-6,8-dimethyl-10-phenylbenzo-[b][1,6]naphthyridine (2.0 g.), potassium bicarbonate (1.5 g.) and benzene (30 ml.) is heated to 75° C. for four hours. Thereafter, the reaction mixture is filtered, concentrated and the residue dissolved in ether which is then washed with water, dried over anhydrous sodium sulfate and concentrated. The crude product is then recrystallized from pyridine to afford 7,8-dichloro-2-[2-(1,2,3,4 - tetrahydro - 6,8 - dimethyl - 10 - phenylbenzo [b][1,6]naphthyridin - 2-yl)acetyl] - 1,2,3,4-tetrahydro-10-(2-pyridyl)benzo[b][1,6]naphthyridine.

In a similar manner the following compounds are prepared:

2 - [3 - (8-trifluoromethyl-1,2,3,4-tetrahydro-10-phenyl-benzo[b][1,6]naphthyridin - 2 - yl)propionyl] - 1,2,3,4-tetrahydro - 8 - iodo-7-methyl-10-phenylbenzo[b][1,6] naphthyridine;

8 - cyano - 2 - [2 - (1,2,3,4 - tetrahydro - 10-phenyl-8-sulfamoylbenzo[b][1,6]naphthyridin - 2 - yl)acetyl]-1,2, 3,4-tetrahydro-10-phenylbenzo[b][1,6]naphthyridine;

8 - ethylthio - 2 - [2-(1,2,3,4-tetrahydro-10-dimethyl-aminobenzo[b][1,6]naphthyridin - 2 - yl)acetyl] - 1,2,3, 4-tetrahydro-10-methoxybenzo[b][1,6]naphthyridine;

8 - carbamoyl - 2 - [2 - (1,2,3,4 - tetrahydro-10-[2-dimethylaminoethyl]aminobenzo[b][1,6]naphthyridin - 2-yl)acetyl] - 1,2,3,4 - tetrahydro-10-propoxybenzo[b][1,6] naphthyridine;

2 - [3 - (1,2,3,4-tetrahydro-10-[3-diethylaminopropyl] aminobenzo[b][1,6]naphthyridin - 2 - yl)propionyl]-1,2, 3,4 - tetrahydro - 10-[3-diethylaminopropyl]aminobenzo-[b][1,6]naphthyridine; and 2 - [2 - (10-ethylthio-1,2,3,4-tetrahydrobenzo[b][1,6] naphthyridin - 2-yl)acetyl]-1,2,3,4-tetrahydro-10-methyl-thiobenzo[b][1,6]naphthyridine.

EXAMPLE XVII

A solution of 8-carbamoyl-7-chloro-2-chloroacetyl-1,2, 3,4 - tetrahydro - 10-phenylbenzo[b][1,6]naphthyridine (4.0 g.), 8-carbethoxy - 1,2,3,4,4a,5,10,10a-octahydro-10-dipropylaminobenzo[b][1,6]naphthyridine (4.0 g.), anhydrous potassium carbonate (3.0 g.) and dimethyl formamide (50 ml.) is heated at 50° C. for three hours. Thereafter, the reaction mixture is filtered, concentrated and the residue dissolved in methylene chloride which is then washed with water, dried over anhydrous sodium sulfate and concentrated. The crude product is then recrystallized from pyridine to afford 8-carbamoyl-2-[2-(8-carbethoxy-1,2,3,4,4a,5,10,10a-octahydro-10 - dipropylamino - benzo [b][1,6]naphthyridin - 2 - yl)acetyl] - 7-chloro-1,2,3,4-tetrahydro10-phenylbenzo[b][1,6]naphthyridine.

By reacting an appropriate 2-haloacyl tetrahydrobenzonaphthyridine with an octahydrobenzonaphthyridine, the following compounds are prepared:

7 - carbomethoxy - 2-[3-(8-chloro-1,2,3,4,4a,5,10,10a-octahydro - 10 - [4 - dimethylaminobutyl]-thiobenzo[b] [1,6]naphthyridin - 2 - yl)propionyl]-1,2,3,4-tetrahydro-10 - (2 - dimethylamino)ethoxybenzo[b][1,6]naphthyridine;

8 - cyano - 2 - [2 - (8-cyano-1,2,3,4,4a,5,10,10a-octahydro - 10 - [3 - diethylamino] - propoxybenzo[b][1,6] naphthyridin - 2 - yl)acetyl]-1,2,3,4-tetrahydro-6-methyl-thio-10-phenylbenzo[b][1,6]naphthyridine;

11

7,8 - dichloro - 10 - [2-diethylaminoethyl]thio-2-[4-(1,2,3,4,4a,5,10,10a - octahydro-10-phenylbenzo[b][1,6] naphthyridin - 2 - yl)butyryl] - 1,2,3,4 - tetrahydrobenzo [b][1,6]naphthyridine;

6,7 - diethoxy-2-[2-(7-ethylsulfonyl-1,2,3,4,4a,5,10,10a-octahydro - 10 - phenylbenzo[b][1,6]naphthyridin-2-yl) acetyl] - 1,2,3,4 - tetrahydrobenzo[b][1,6]naphthyridine; and 8 - bromo - 2 - [2-(1,2,3,4,4a,5,10,10a-octahydro-10-phenylbenzo[b][1,6]naphthyridin - 2 - yl)acetyl]-1,2,3,4-tetrahydro - 7 - methyl - 10 - propylthiobenzo[b][1,6] naphthyridine.

EXAMPLE XVIII

Repeating the procedure of Example XI, to react an appropriate 2-haloacyl octahydrobenzonaphthyridine with an octahydrobenzonaphthyridine, the following compounds are produced:

7,8 - diethyl-2-[2-(7,8,-diethyl-1,2,3,4,4a,5,10,10a-octahydro - 10 - phenylbenzo[b][1,6]naphthyridin - 2 - yl) acetyl] - 1,2,3,4a,5,10,10a - octahydro-10-phenylbenzo[b][1,6]naphthyridine;

8 - butylsulfonyl - 2 - [2-(6,9-dichloro-1,2,3,4,4a,5,10, 10a - octahydro - 10-propylbenzo[b][1,6]naphthyridin-2-yl)acetyl] - 1,2,3,4,4a,5,10,10a - octahydro - 10 - phenylbenzo[b][1,6]naphthyridine;

2 - [2-(1,2,3,4,4a,5,10,10a - octahydro - 7,8-dimethyl-10 - phenylbenzo[b][1,6]naphthyridin-2-yl)acetyl]-1,2,3, 4,4a,5,10,10a - octahydro - 8 - methylsulfonyl-10-phenylbenzo[b][1,6]naphthyridine;

10 - ethoxy - 2 - [2-(1,2,3,4,4a,5,10,10a-octahydro-10-phenyl[b][1,6]naphthyridin - 2 - yl)acetyl]-1,2,3,4,4a,5, 10,10a-octahydro; and 7 - trifluoromethyl - 2 - [2 - (1,2,3,4,4a,5,10,10a-octahydro - 10 - methoxybenzo[b][1,6]naphthyridin - 2 - yl) acetyl] - 1,2,3,4,4a,5,10,10a - octahydro - 10-methylthiobenzo[b][1,6]naphthyridine.

EXAMPLE XIX

A solution of 7,8-dibromo-2-bromoacetyl-1,2,3,4,4a,5, 10,10a - octahydro-10-phenylbenzo[b][1,6]naphthyridine (8.0 g.), 7,8-dibromo-1,2,3,4-tetrahydro-10-phenylbenzo-[b][1,6]naphthyridine (8.0 g.), anhydrous sodium carbonate (6.0 g.) and dimethylacetamide (100 ml.) is heated at 160° C. for one hour. Thereafter, the reaction mixture is filtered, concentrated and the residue dissolved in chloroform which is then washed with water, dried over anhydrous sodium sulfate and concentrated. The crude product is recrystallized from pyridine to afford 7,8-dibromo - 2 - [2-(7,8-dibromo-1,2,3,4-tetrahydro-10-phenylbenzo[b][1,6]naphthyridin - 2-yl)acetyl]-1,2,3,4,4a,5,10, 10a-octahydro-10-phenylbenzo[b][1,6]naphthyridine.

Similarly, 2 - [2-(7-ethylsulfonyl-1,2,3,4-tetrahydro-10-propylbenzo[b][1,6]naphthyridin - 2 - yl)acetyl]-1,2,3,4, 4a,5,10,10a - octahydro - 10-methoxy-8-sulfamoylbenzo-[b][1,6]naphthyridine; 2 - [3-(8-carbamoyl-1,2,3,4,4a,5, 10,10a - octahydro - 10-dipentylaminobenzo[b]1,6]naphthyridin - 2 - yl)propionyl]-8-chloro-1,2,3,4-tetrahydro-7-methyl - 10 - phenylbenzo[b][1,6]naphthyridine and 2-[2-(1,2,3,4,4a,5,10,10a - octahydro - 10-[2-dimethylaminoethyl] - thiobenzo[b][1,6]naphthyridin-2-yl)acetyl]-1,2, 3,4 - tetrahydro - 10-phenylbenzo[b][1,6]naphthyridine are synthesized.

EXAMPLE XX

The hydrochloride salt of 8-chloro-2-[2-(8-chloro-1,2,3,4 - tetrahydro - 10 - phenylbenzo[b][1,6]naphthyridin - 2 - yl)acetyl - 1,2,3,4,4a,5,10,10a - octahydro-10-phenylbenzo[b][1,6]naphthyridine is prepared by admixing an ethanolic solution of the compound with a 1 N aqueous solution of hydrochloric acid and, thereafter, removing the cosolvents under vacuum.

Other acid addition salts of the compounds described in the above examples are prepared by similar procedures employing hydrobromic acid, hydroiodic acid, nitric acid, sulfuric acid, phosphoric acid, citric acid, tartaric acid,

12 acetic acid, succinic acid, maleic acid and gluconic acid.

What is claimed is:

1. A compound selected from the group consisting of those having the formula:

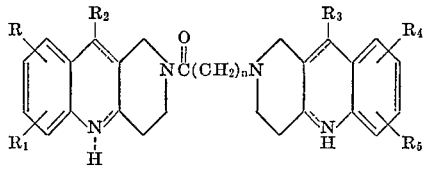

wherein R, $R_1$, $R_4$ and $R_5$ are selected from the group consisting of hydrogen, halogen, lower alkyl, provided that adjacent moieties are not t-butyl; $R_2$ and $R_3$ are both selected from the group consisting of hydrogen, lower alkyl, phenyl, lower alkylphenyl and 2-thienyl; and the groupings:

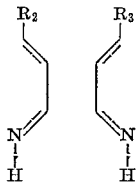

indicate the positions of a pair of optional double bonds for each grouping; $n$ is an integer from 1 to 6; and the acid addition salts thereof.

2. A compound as described in claim 1 wherein R and $R_4$ are hydrogen; $R_1$ and $R_5$ are chloro fixed in their respective 8-positions; $R_2$ and $R_3$ are phenyl; groupings (I) and (II) both possess a pair of double bonds; and $n$ is 1 which is: 8-chloro-2-[2-(8-chloro-1,2,3,4-tetrahydro-10 - phenylbenzo[b][1,6]naphthyridin - 2 - yl)acetyl]-1,2,3,4 - tetrahydro - 10 - phenylbenzo[b][1,6]naphthyridine.

3. A compound as described in claim 1 wherein R, $R_1$ and $R_4$ are hydrogen; $R_2$ and $R_3$ are phenyl; $R_5$ is chloro fixed in the 8-position; groupings (I) and (II) both possess a pair of double bonds; and $n$ is 1 which is: 8-chloro-2 - [2 - (1,2,3,4 - tetrahydro - 10 - phenylbenzo[b][1,6]-naphthyridin - 2 - yl)acetyl] - 1,2,3,4 - tetrahydro - 10-phenylbenzo[b][1,6]naphthyridine.

4. A compound as described in claim 1 wherein R and $R_4$ are hydrogen; $R_1$ and $R_5$ are chloro fixed in their respective 8-positions; $R_2$ and $R_3$ are phenyl; groupings (I) and (II) are both saturated; and $n$ is 1 which is: 8-chloro - 2 - [2 - (8 - chloro - 1,2,3,4,4a,5,10,10a - octahydro - 10 - phenylbenzo[b][1,6]naphthyridin - 2 - yl)-acetyl] - 1,2,3,4,4a,5,10,10a - octahydro - 10 - phenylbenzo[b][1,6]naphthyridine.

5. A compound as described in claim 1 wherein R, $R_1$ and $R_4$ are hydrogen; $R_2$ and $R_3$ are phenyl; $R_5$ is chloro fixed in the 8-position; groupings (I) and (II) are both saturated; and $n$ is 1 which is: 8-chloro-2-[2-(1,2,3,4,4a, 5,10,10a - octahydro - 10 - phenylbenzo[b][1,6]naphthyridin - 2 - yl)acetyl] - 1,2,3,4,4a,5,10,10a - octahydro-10-phenylbenzo[b][1,6]naphthyridine.

6. A compound as described in claim 1 wherein R and $R_4$ are hydrogen; $R_1$ is chloro fixed in the 8-position; $R_2$ and $R_3$ are phenyl; $R_5$ is bromo fixed in the 8-position; grouping (I) possesses a pair of double bonds; grouping (II) is saturated; and $n$ is 1 which is: 8-bromo-2-[2-(8-chloro - 1,2,3,4,4a,5,10,10a - octahydro - 10 - phenylbenzo[b][1,6]naphthyridin - 2 - yl)acetyl] - 1,2,3,4-tetrahydro-10-phenylbenzo[b][1,6]naphthyridine.

7. A compound as described in claim 1 wherein R, $R_1$ and $R_4$ are hydrogen; $R_2$ is 2-thienyl; $R_3$ is 4-tolyl; $R_5$ is chloro fixed in the 8-position; grouping (I) possesses a pair of double bonds; grouping (II) is saturated and $n$ is 2 which is: 8-chloro-2-[3-(1,2,3,4,4a,5,10,10a-octahydro-10-(2-thienyl)benzo[b][1,6]naphthyridin - 2 - yl)propionyl] - 1,2,3,4 - tetrahydro - 10 - (4 - tolyl)benzo[b][1,6]-naphthyridine.

8. A compound as described in claim 1 wherein R and $R_4$ are hydrogen; $R_1$ and $R_5$ are chloro fixed in their respective 8-positions; $R_2$ and $R_3$ are phenyl; grouping (I) is saturated; grouping (II) possesses a pair of double bonds; and $n$ is 1 which is: 8 - chloro - 2-[2-(8-chloro-1,2,3,4 - tetrahydro - 10 - phenylbenzo[b][1,6]naphthyridin - 2 - yl)acetyl]1,2,3,4,4a,5,10,10a - octahydro - 10-phenylbenzo[b][1,6]naphthyridine.

9. A compound as described in claim 1 wherein R and $R_4$ are hydrogen; $R_1$ is chloro fixed in the 8-position; $R_2$ is propyl; $R_3$ is phenyl; $R_5$ is bromo fixed in the 8-position; grouping (I) is saturated; grouping (II) possesses a pair of double bonds; and $n$ is 1 which is: 8-bromo-2-[2 - (8 - chloro - 1,2,3,4 - tetrahydro - 10 - propylbenzo[b][1,6]naphthyridin - 2 - yl)acetyl] - 1,2,3,4,4a,5,10,10a-octahydro-10-phenylbenzo[b][1,6]naphthyridine.

10. A compound as described in claim 1 wherein R and $R_1$ are methyl respectively fixed at the 6- and 8-positions; $R_2$ is phenyl; $R_3$ is 2-pyridyl; $R_4$ and $R_5$ are chloro respectively fixed at the 7- and 8-position; groupings (I) and (II) both possess a pair of double bonds; and $n$ is 1 which is: 7,8 - dichloro-2-[2 - (1,2,3,4-tetrahydro - 6,8-dimethyl - 10 - phenylbenzo[b][1,6]naphthyridin - 2 - yl)-acetyl]-1,2,3,4-tetrahydro - 10 - (2 - pyridyl)benzo[b]-[1,6]naphthyridine.

No references cited.

DONALD G. DAUS, Primary Examiner

U.S. Cl. X.R.

260—286, 288, 690; 424—258